United States Patent Office

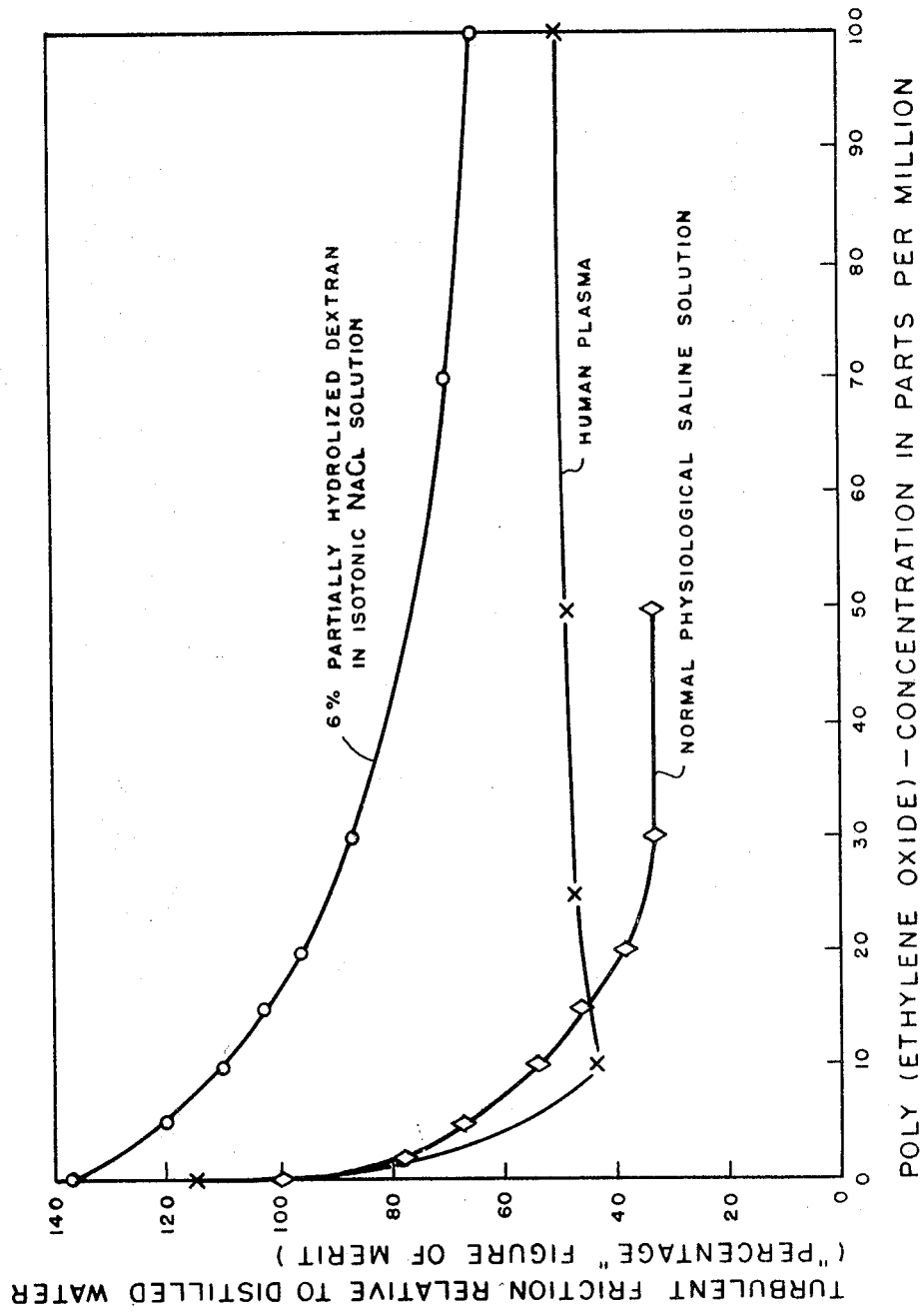

3,590,124
Patented June 29, 1971

3,590,124
BLOOD TRANSFUSION FLUIDS HAVING RE-
DUCED TURBULENT FRICTION PROPERTIES
Jack W. Hoyt, Pasadena, Calif., assignor to the United
States of America as represented by the Secretary of
the Navy
Filed June 27, 1967, Ser. No. 649,367
Int. Cl. A61k 27/00
U.S. Cl. 424—78       4 Claims

ABSTRACT OF THE DISCLOSURE

To a blood transfusion fluid, such as blood plasma, blood volume extender, blood substitute, or the like, is added small concentrations of soluble high-polymer material characterized by a generally linear, long chain molecular structure and a molecular weight in excess of 100,000. The concentration of polymer is in the range of 5–100 parts per million by weight (w.p.p.m.).

---

The invention described herein may be manufactured and used by or for the Government of the United States of America for governmental purposes without the payment of any royalties thereon or therefor.

This invention relates to blood transfusion fluids such as blood plasma, blood plasma volume extenders, blood substitutes, and the like, which are for introduction into the blood system by injection into a blood vessel.

A consideration in the development of blood transfusion fluids is the reduction of the turbulent friction properties of the fluid. Although the flow velocities in the human blood system are not known with great precision there is respected authority that turbulent flow occurs in many areas in the human blood system. See R. L. Whitmore, "Hemorheology and Hemodynamics," Biorheology, vol. 1, pp. 201–220, 1963. Hence a reduction of turbulent friction properties of a transfusion fluid would reduce the body pumping requirements for the sick, injured, or wounded person receiving the transfusion. A particular case where this would be of benefit is in connection with a patient having a weak heart.

Accordingly, an object of this invention is to provide a blood transfusion fluid having properties which reduce the body pumping requirments during a transfusion.

Other objects and many of the attendant advantages of this invention will be readily appreciated as the same becomes better understood by reference to the following detailed description when considered in connection with the accompanying drawing wherein the single figure is a graph showing turbulent friction properties of exemplary transfusion fluids in accordance with the present invention.

In accordance with this invention, the above and other objects are realized by adding to a base transfusion fluid small amounts of water soluble polymer materials of the class having a generally linear long chain molecular structure and a molecular weight in excess of 100,000. The amount needed to be added is less than 100 parts per million by weight. Significant reductions in turbulent friction can be achieved with concentrations of polymer additive as low as 5 w.p.p.m.

Among the water soluble polymers suitable for use in practicing the invention are the following:

(1) Poly(ethylene oxide)
(2) Polyacrylamide
(3) Linear poly-saccharides

Among the base transfusion fluids suitable for use in practicing the invention are the following:

(1) 6% solution of hydrolized dextran in an isotonic sodium chloride solution.

(2) Normal physiological saline solution (nominal 0.85% NaCl aqueous solution).
(3) Irradiated normal liquid human plasma.

The concentration of polymer agent to be employed will vary according to the specific agent used, and each base transfusion solution has its own optimum turbulent friction reduction concentration. Generally speaking, even very low concentrations of polymer material, of the order of less than ten parts per million will produce significant reductions in turbulent friction characteristics. Larger concentrations will provide further friction reductions up to a point of marginal return. The optimum concentration to be used for each liquid base transfusion solution can be easily determined by the user to provide best results.

TURBULENT FRICTION TEST APPARATUS

The improvement in turbulent friction properties of the transfusion fluid will be more fully described in connection with examples involving a test program employing the apparatus disclosed in the co-pending application of J. W. Hoyt entitled "Turbulent Friction Measurements" Ser. No. 456,579, filed May 15, 1965 now U.S. Pat. No. 3,327,522. This apparatus flows a test specimen of a fluid through a thin conduit at a given flow rate under conditions which assure fully developed turbulent flow therealong, a pair of spaced pressure sensing stations being provided along the conduit. What is obtained by use of this apparatus is a quantitative figure of merit, representing the turbulent flow friction properties of the specimen of fluid relative to that of distilled water. This figure of merit, expressed as a percentage, is obtained from test measurements made with use of the apparatus and by calculation in accordance with the following formula:

$$\text{Percentage} = \left(1 - \frac{A}{B}\right) 100$$

wherein

A = the measured average pressure differential between the two stations for the specimen, and
B = the corresponding pressure differential for distilled water.

As mentioned earlier, the referenced publication of R. L. Whitmore indicates occurrence of turbulent flow conditions in areas of human blood vessel system. The data resulting from testing by means of the apparatus represents the effectiveness of solutions in reduction of turbulent friction under such conditions.

EXAMPLE I

Normal physiological saline solution with small concentrations of poly(ethylene oxide).—Small predetermined concentrations of poly(ethylene oxide) are added to the otherwise conventional normal physiological saline solution, which is a 0.85% sodium chloride solution in water. A suitable commercially available material is Polyox WSR–301 produced by Union Carbide Corp. It has the following chemical group as the basic repeating unit in its molecular structure:

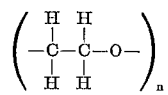

wherein $n$ is an integer greater than one. The physical form, as used in the invention, is a powder of smaller than 200 mesh sieve size. The polymer is completely dissolved in the NaCl solution by slow stirring for a period of three to four hours. The results of testing various polymer concentrations in the range 2–100 w.p.p.m. are shown in the graph of the drawing, by the curve fitted to the diamond-shaped plot points. The plot point for zero polymer concentration corresponds to turbulent friction of the base transfusion solution, alone. Accordingly, the relative effectiveness of a given polymer concentration may be readily discerned from the plot by comparison of the percentage for the given concentration, with that of the base liquid alone.

EXAMPLE II

6% partially hydrolized dextran in isotonic NaCl solution with small concentration of poly(ethylene oxide).—Small predetermined concentrations of poly(ethylene oxide) are added to the otherwise conventional 6% hydrolized dextran solution. The latter is more fully described as a sterile, non-pyrogenic 6% (w./v.) solution of partially hydrolized dextran in an isotonic sodium chloride solution. A suitable commercially available form of the material may be obtained from C.S.C. Pharmaceutical, Div. of Commercial Solvents Corporation, New York, N.Y. The form, exemplary commercial source, and method of addition of the poly(ethylene oxide) are the same as in connection with Example I. The results of testing various polymer concentrations in the range 5–100 w.p.p.m. are shown in the graph of the drawing by the curve fitted to the circle-shaped plot points. As with the previous example, relative effectiveness may be readily discerned by comparison to the zero polymer concentration plot point.

EXAMPLE III

Normal liquid human plasma with small concentrations of poly(ethylene oxide).—Small predetermined concentrations of poly(ethylene oxide) are added to otherwise conventional irradiated normal liquid human plasma. The latter is more fully described as pooled normal plasma, which, during its processing, has been held at least 6 months at a controlled temperature of 30° to 32° C. and has been subjected to ultraviolet irradiation. Further, most of the fibrin has been removed during processing by the addition of calcium chloride, and the calcium content has been brought back to the normal range by ion exchange. Still further, dextrose, 5% (w./v.), has been added to lessen the chance of fibrin formation. A suitable commercial form of the material may be obtained from Hyland Laboratories, Los Angeles, Calif., and is described in their brochure D–123/8066, revised August 1965. The form, exemplary commercial source, and method of addition of the poly(ethylene oxide) are the same as in connection with Example I. The results of testing various polymer concentrations in the range 5–100 w.p.p.m. are shown in the graph of the drawing by the curve fitted to the X-shaped plot points. Again relative effectiveness is discernible by comparison to the zero polymer concentration plot point.

While the invention has been described with reference to transfusion fluids, it should be recognized that its teachings could be applied in other areas of therapeutic medicine in which lowering the turbulent friction in the body blood system would be an advantage. The base transfusion fluid, with any of the additives, are administered to a patient in the manner commonly employed for such administration.

Obviously many modifications and variations of the present invention are possible in the light of the teachings. It is therefore to be understood that within the scope of the appended claims the invention may be practiced otherwise than as specifically described.

What is claimed is:

1. A composition for injection into the blood system comprising a blood transfusion fluid and 5 to 100 parts per million by weight of a water soluble poly(ethylene oxide) having a molecular weight in excess of 100,000.

2. The composition of claim 1 wherein the blood transfusion fluid is a solution of about 6%, by weight, of partially hydrolized dextran in an isotonic sodium chloride solution.

3. The composition of claim 1 wherein the blood transfusion fluid is about 0.85% sodium chloride, by weight, in water.

4. The composition of claim 1 wherein the blood transfusion fluid is normal liquid human plasma.

References Cited

Gadd, Nature, No. 4983, pp. 463–67, May 1, 1965.
Naranjo et al: Proc. Soc. Exp. Biol. & Med., pp. 12–16, May 1959.
Biological Abstracts, vol. 29, sec. 8280, 1955.

SAM ROSEN, Primary Examiner

U.S. Cl. X.R.
424—101